US005991995A

United States Patent [19]

Gabbey

[11] Patent Number: 5,991,995

[45] Date of Patent: Nov. 30, 1999

[54] APPARATUS FOR REMOVING AN OUTER LAYER FROM A PORTION OF A MULTI LAYER TUBE

[75] Inventor: David J. Gabbey, Pinckney, Mich.

[73] Assignee: Pilot Industries, Inc., Dexter, Mich.

[21] Appl. No.: 09/213,966

[22] Filed: Dec. 17, 1998

[51] Int. Cl.[6] .......... B23P 19/02

[52] U.S. Cl. .......... 29/426.4

[58] Field of Search .......... 451/80; 29/426.4; 156/584; 221/73; 269/53, 57, 47

[56] References Cited

U.S. PATENT DOCUMENTS

| | | | |
|---|---|---|---|
| 2,100,534 | 11/1937 | Zimmerman | 269/47 |
| 4,662,125 | 5/1987 | Brenner et al. | 51/419 |
| 5,885,401 | 3/1999 | Eiban | 156/584 |

*Primary Examiner*—Timothy V. Eley
*Assistant Examiner*—Benjamin M. Halpern
*Attorney, Agent, or Firm*—Gifford, Krass, Groh, Sprinkle, Anderson & Citowski, P.C.

[57] ABSTRACT

An apparatus for removing an outer layer from a portion of a multi layer tube is disclosed. The apparatus includes a support assembly which holds the portion of the tube at a preset position. A nozzle is fluidly connected to a source of high pressure water and has its outlet directed towards the portion of the tube. A relative, rotary motion about a concentric axis between the nozzle and the tube directs the water such that it removes the outer layer from the tube portion around the entire circumfery of the tube. In one embodiment, the nozzle is held stationary while the tube portion is rotated relative to the nozzle while in a second embodiment the tube portion is held stationary while the nozzle is rotated relative to the tube portion. The apparatus is particularly useful for removing an outer nylon covering from a metal tube.

13 Claims, 3 Drawing Sheets

APPARATUS FOR REMOVING AN OUTER LAYER FROM A PORTION OF A MULTI LAYER TUBE

BACKGROUND OF THE INVENTION

I. Field of the Invention

The present invention relates to a device for removing an outer layer from a portion of a multi layer tube.

II. Description of the Prior Art

Multi layer tubes are used in a multiplicity of different applications including the auto industry. For example, such multi layer tubing is used for the brake tube assembly for automotive vehicles.

The brake tube assembly for automotive vehicles typically comprises a multi layer construction in which the innermost layer consists of a metal tube, typically made of copper coated low carbon steel. The metal tube is rolled from flat stock into a tube and brazed together in order to form the inner metal tube.

In order to protect the inner metal tube from corrosion, a corrosion resistant coating, typically made of zinc-based alloy, is provided around the entire circumfery of the inner metal tube. An outer protective sleeve, typically constructed of nylon, is then applied over the corrosion resistant coating to protect the corrosion resistant coating, and thus the inner metal tube, from abrasion and other mechanical impact. Consequently, the entire brake tube assembly comprises a three layer construction having an inner metal tube, a middle corrosion resistant coating and an outer nylon sleeve.

In order to attach a metal end connector, such as a brake tube nut, to the brake tube assembly, it is necessary to first remove the outer nylon sleeve from the end portion of the brake tube assembly. However, since the nylon exhibits substantial adherence to the corrosion resistant coating, it has been previously difficult to achieve both rapid and complete removal of the nylon from the end portion of the brake tube assembly. The inability to rapidly remove the nylon from the end portion of the brake tube assembly increases the overall manufacturing cost while the failure to completely remove the nylon from the end portion of the brake tube assembly can result in an inadequate and unacceptable seal between the end connector and the end portion of the brake tube assembly.

SUMMARY OF THE PRESENT INVENTION

The present invention provides an apparatus for removing an outer layer of a multi layer tube construction which is particularly useful for removing the outer nylon layer from a brake tube assembly.

In brief, the apparatus of the present invention comprises a housing having a tube feed assembly which supports the tube assembly such that the end portion of the tube assembly is in an exposed position. Optionally, a sleeve is also selectively disposed around the tube and movable between a retracted position, in which the end portion of the tube assembly is exposed, and an extended position in which the sleeve covers the end portion of the tube assembly. The sleeve thus enables the end portion of the tube assembly to be exposed only during a removal operation.

A nozzle is mounted to the housing and is fluidly connected to a source of high pressure water, preferably in the range of 10,000 psi–35,000 psi. An outlet of the nozzle is directed towards the end portion of the tube when the tube is held by the tube feed assembly and the sleeve, if present, is moved to its retracted position.

The end portion of the tube and the nozzle are rotated relative to each other so that the water spray impinges around the entire circumfery of the tube end portion. In one embodiment, the nozzle is held stationary while an actuator rotates the tube relative to the nozzle.

In a second embodiment, the tube is held stationary and the nozzle is mounted to an arm rotatably mounted to the housing about the tube end portion. Consequently, upon rotation of the arm coaxially around the tube end portion, the high pressure output from the nozzle impinges upon the exposed end portion of the tube assembly thus removing the outer nylon layer around the entire circumfery of the tube assembly.

In practice, both versions of the apparatus of the present invention have proven effective for removing the outer nylon layer from a brake tube assembly rapidly and without damaging the corrosion resistant coating around the inner metal tube.

Optionally, a support assembly engages and supports the free end of the tube end portion.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENTS OF THE PRESENT INVENTION

Figure 1:
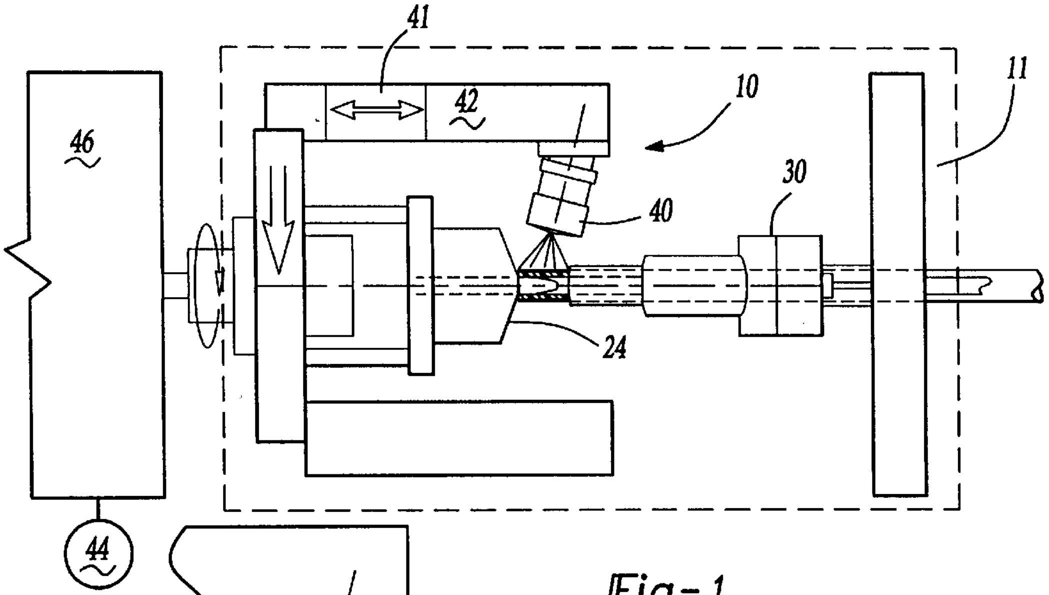
FIG. 1 is a side diagrammatic view illustrating a preferred embodiment of the present invention.
Figure 4:
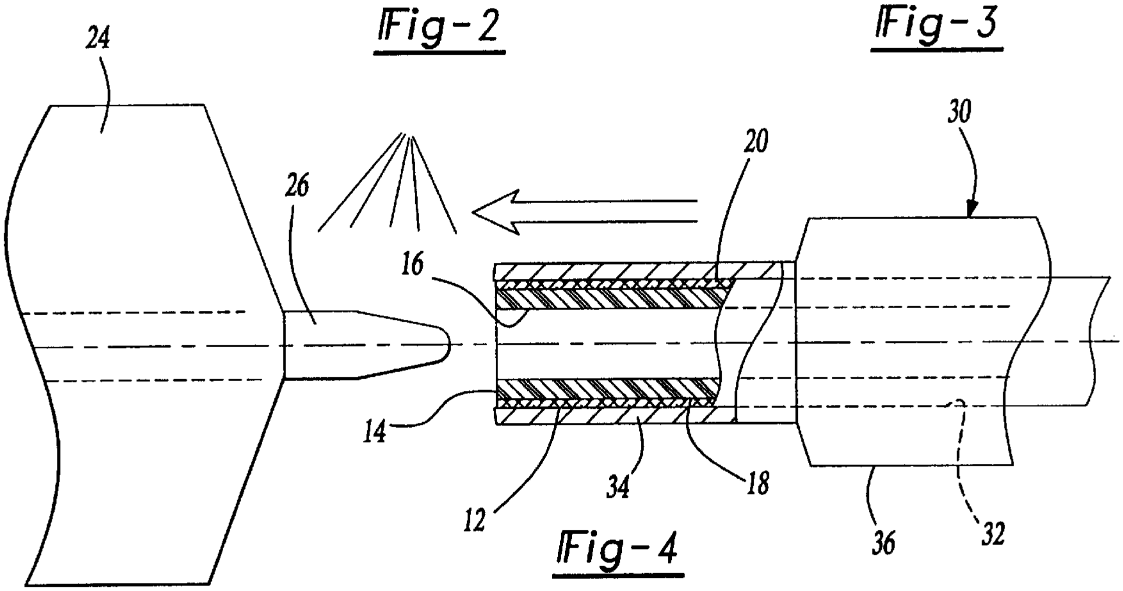
FIG. 4 is a fragmentary partial sectional view illustrating a portion of the present invention at an initial step of removing the outer layer from the tube assembly.

With reference first to FIGS. 1 and 4, a preferred embodiment of the apparatus 10 of the present invention for removing an outer nylon layer 20 of a multi layer tube assembly 14 is there shown. The tube assembly 14 illustrated in the drawing is a multi layer brake tube assembly having an inner metal tube 16 (FIG. 4). The metal tube 16 is typically constructed of copper-coated low carbon steel and is rolled from flat stock into a tube and brazed together to form the tube. A corrosion resistant coating 18, typically zinc based, is then provided around the outer periphery of the metal tube 16. The outer nylon layer 20 is then extruded around the outer periphery of the corrosion resistant coating 18 in order to protect both the coating 18 and the metal tube 16 from abrasion and the like.

Figure 3:
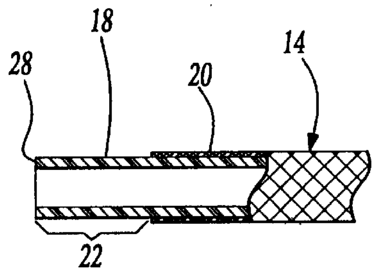
FIG. 3 is a fragmentary longitudinal sectional view illustrating a tube following removal of the outer layer by the apparatus of the present invention.

As best shown in FIG. 3, in order to attach an end connector such as a tube nut, typically made of metal, to one end of the tube assembly 14, it is necessary that the outer nylon layer 20 be removed from an end portion 22 of the tube assembly 14. The removal of the nylon layer 20 from the end portion 22 of the tube assembly 14 thus exposes the corrosion resistant coating 18 at the end of the tube.

Figure 2:
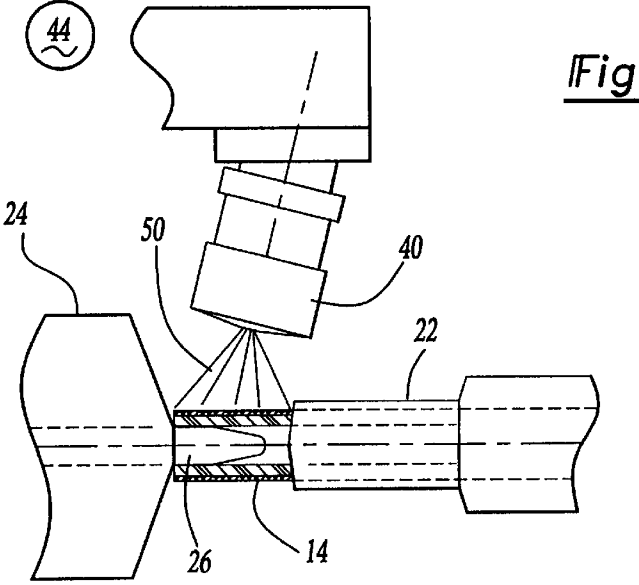
FIG. 2 is a fragmentary diagrammatic side view of a portion of the preferred embodiment of the present invention.

With reference now to FIGS. 1, 2 and 4, the apparatus 10 includes a housing 11 having an optional support assembly 24 having an outwardly projecting pin 26. The pin 26, as best shown in FIG. 2, is dimensioned to fit within the end of the tube assembly 14 thus supporting the end of the tube assembly 14.

Figure 5:
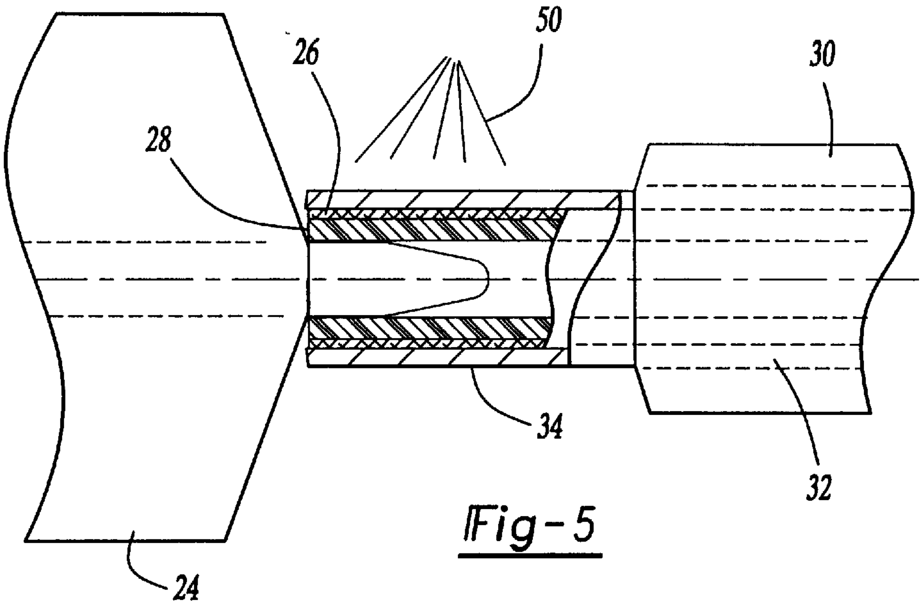
FIG. 5 is a view similar to FIG. 4 but illustrating a subsequent step.
Figure 6:
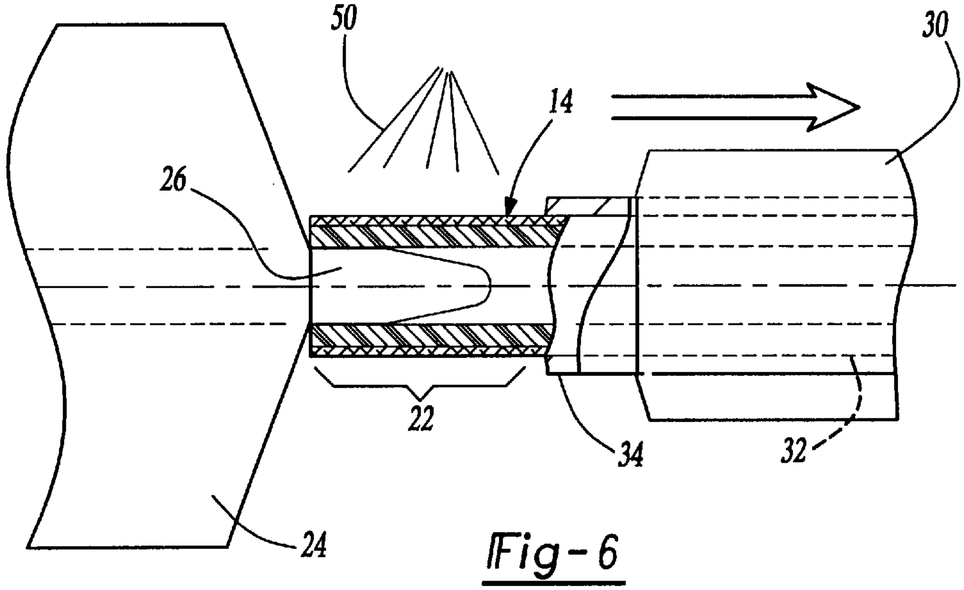
FIG. 6 is a view similar to FIG. 5 but illustrating still a further subsequent step.

With reference now to FIGS. 4–6, an end feed assembly 30 mounted to the housing 11 is provided for selectively positioning the end 28 of the tube assembly 14 over the pin 26. The end feed assembly 30 includes a throughbore 32 having an optional coaxial sleeve 34 through which the tube assembly 14 slidably extends. Any conventional means 36 are then provided for moving the sleeve 34 between an extended position, illustrated in FIG. 5, and a retracted position, illustrated in FIG. 6. In its extended position, the sleeve 34 is positioned coaxially around the pin 26. Conversely, in its retracted position (FIG. 6) the sleeve 34 exposes the end portion 22 of the tube assembly 14. With the end portion 22 exposed as illustrated in FIG. 6, the free end 28 of the tube assembly 14 is supported by the pin 26 of the optional support assembly 24 while the end feed assembly 30 supports the tube assembly 14 about the inner end of the exposed portion 22.

Figure 7:
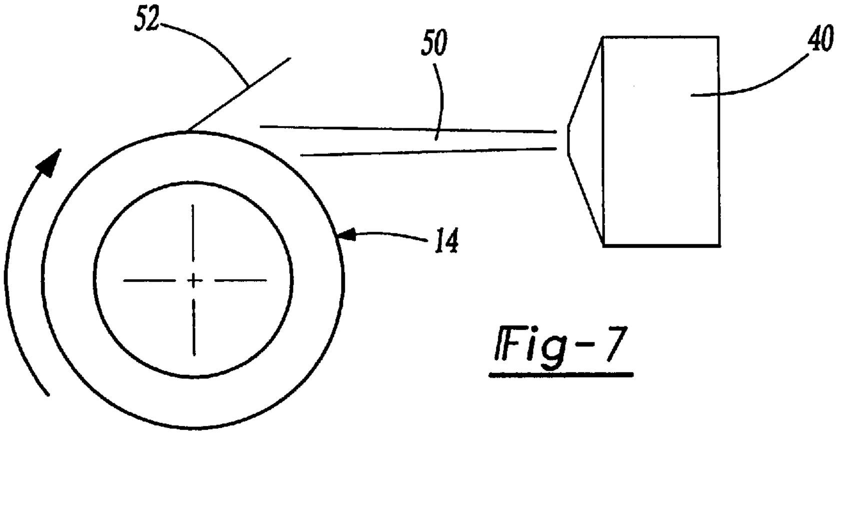
FIG. 7 is an axial end view illustrating the removal of the outer layer from the tube assembly by the apparatus of the present invention.

Referring now to FIGS. 1 and 7, a water nozzle 40 is rotatably secured to the optional support assembly 24 by an elongated arm 42 so that, upon rotation of the arm 42 with the attached nozzle 40, the nozzle 40 extends entirely circumferentially around the exposed portion 22 of the tube assembly 14 when the free end 28 of the tube assembly 14 is positioned over the pin 26 and the sleeve 34 is moved to its retracted position (FIG. 2). A longitudinal drive unit 41 is optionally connected to the nozzle 40 to move the nozzle 40 longitudinally with respect to the tube assembly 14. A high pressure source of water, preferably in the range of 10,000 psi to 35,000 psi, is fluidly connected to the nozzle 40 by conventional fluid fittings which permit rotation of the arm 42 relative to the high pressure water source 44. A conventional rotary drive unit 46 (FIG. 1) rotatably drives the arm 42, and thus the nozzle 40, coaxially around the support assembly 24. Alternatively, the water flow through the nozzle 40 can be used to rotate the arm 42 around the support assembly 24.

As best shown in FIGS. 2 and 7, the nozzle 40 is designed to produce a flat spray output in a direction substantially perpendicular to the axis of the tube assembly 14. Furthermore, as best shown in FIG. 7, the nozzle 40 is positioned such that this flat spray 50 impinges substantially tangentially on the tube assembly 14. Consequently, as the nozzle assembly 40 is rotatably driven circumferentially around the tube assembly 14, the high pressure water spray 50 effectively peels the outer nylon layer 20 from the tube assembly 14 as illustrated at 52 in FIG. 7.

In operation, the optional sleeve 34 is first moved to the position shown in FIG. 5 in which the sleeve 34 extends around the pin 26 on the optional support assembly 24. The tube assembly 14 is then fed through the throughbore 32 and sleeve 34 to the position shown in FIG. 5 in which the end 28 of the tube assembly 14 is positioned over the pin 26.

The end feed assembly 30 then moves the sleeve 34 to its retracted position illustrated in FIG. 6 thus exposing the end portion 22 of the tube assembly 14 to the high pressure water spray 50 from the nozzle 40. As the nozzle 40, and thus the water spray 50 is moved circumferentially around the exposed end portion 22 of the tube assembly 14, the water spray 50 removes the outer nylon layer 20 from the tube assembly 14 rapidly, efficiently and completely. In practice, the outer nylon layer 20 can be removed from the end portion 22 in approximately five seconds.

Following removal of the outer tube layer 20 from the tube assembly 14, the sleeve 34 is again moved to its extended position (FIG. 5) and the completed tube assembly 14 is removed from the feed assembly 30. A new unprocessed tube assembly is then reinserted through the end feed assembly 30 to the position shown in FIG. 5 and the above process is repeated.

The (optional) extendable and retractable sleeve 34 achieves two separate purposes. First, extension of the sleeve 34 to its extended position illustrated in FIG. 5 ensures that the end 28 of the tube assembly 14 is properly seated over the pin 26. Furthermore, since the sleeve 34 protects the tube assembly 14 from the water spray 50 whenever the sleeve 34 is in its extended position (FIG. 5), the water spray 50 can be operated continuously while the retraction of the sleeve 34 provides for a controlled time exposure of the end portion 22 of the tube assembly 14 to the water spray 50.

Figure 8:
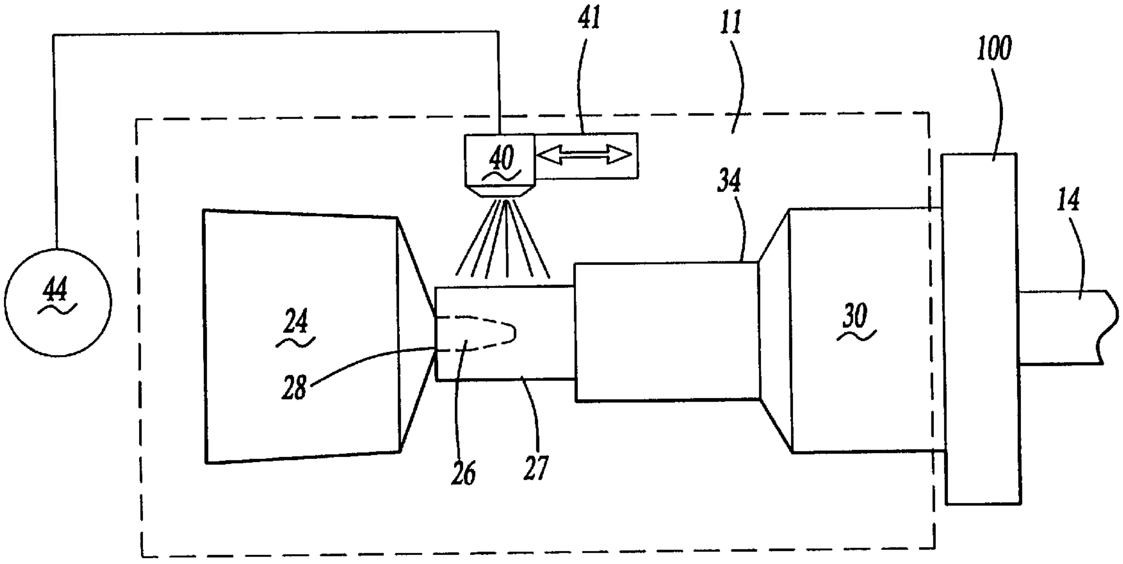
FIG. 8 is a side diagrammatic view.

With reference now to FIG. 8, a second preferred embodiment of the invention is there shown having a housing 11. The end feed assembly 30, having the optional retractable sleeve 34, selectively positions and exposes the end portion 22 of the tube assembly 14 in the housing 11. The pin 26 of the optional support assembly 24 supports the free end 28 of the tube end portion 22.

The nozzle 40 is fluidly connected to the high pressure water source 22 and is mounted in the housing 11 such that its spray output is directed toward the tube end portion 22 and tangentially impinges upon the tube end portion 22 (see FIG. 7). The longitudinal drive unit 41 is also optionally connected to the nozzle 40 to enable the apparatus 10 to strip the tube assembly 14 a distance greater than the width of the nozzle spray. Unlike the first preferred embodiment, however, in the second preferred embodiment the nozzle 40 is fixed relative to the tube assembly 14. In order to rotatably move the tube assembly 14 relative to the nozzle 40, a rotary drive unit 100 is operatively connected to the tube assembly 14 and/or the end feed assembly 30. Thus, upon activation of the rotary drive unit 100, the tube assembly is rotated relative to the nozzle 40.

From the foregoing, it can be seen that the present invention provides a simple and yet highly effective apparatus for effectively removing the outer layer of a multi layer tube assembly and which is particularly useful for removing the outer nylon layer from a multi layer brake tube assembly. Having described my invention, however, many modifications thereto will become apparent to those skilled in the art to which it pertains without deviation from the spirit of the invention as defined by the scope of the appended claims.

I claim:

1. Apparatus for removing an outer layer from a portion of a multi layer cylindrical tube comprising:

a housing, an end feed assembly which positions the portion of the tube at a preset position, a source of high water pressure, a cutting jet nozzle having an outlet which produces a water stream along a predefined path capable of cutting through an outer layer of the multi layer tube, said water source being fluidly connected to said nozzle, a rotary drive unit which rotates one of the tube portions and said nozzle relative to each other so that said water spray impinges sequentially and substantially tangentially around the entire periphery of the tube portion to thereby cut off an outer layer of the multi layer tube from the tube portion.

2. The invention as defined in claim 1 and comprising a support assembly having a pin insertable into a free end of the tube.

3. The invention as defined in claim 2 wherein said end feed assembly further comprises a sleeve positioned around the tube portion, said sleeve being movable between an extended position in which said sleeve is positioned around and protects the tube portion, and a retracted position in which said sleeve exposes said tube portion.

4. The invention as defined in claim 1 wherein said rotary drive unit comprises an arm coaxially rotatably mounted to said housing around the tube portion.

5. The invention as defined in claim 1 wherein said nozzle directs said water spray in a direction substantially perpendicular to an axis of said tube.

6. The invention as defined in claim 1 wherein said source is pressurized in the range of 10,000 psi to 35,000 psi.

7. The invention as defined in claim 1 wherein said outer layer of said tube is nylon.

8. The invention as defined in claim 1 wherein said tube includes an inner metal layer and said outer layer comprises nylon.

9. The invention as defined in claim 1 wherein said rotary drive unit rotates the tube end portion.

10. The invention as defined in claim 1 wherein said rotary drive unit rotates said end feed assembly.

11. The invention as defined in claim 1 and comprising a longitudinal drive unit operatively connected with the nozzle which moves the nozzle longitudinally with respect to the tube.

12. Apparatus for removing an outer layer from a portion of a multi layer tube comprising:

a housing, an end feed assembly which positions the portion of the tube at a preset position, a source of high pressure water, a nozzle, said water source being fluidly connected to said nozzle to produce a high speed water spray, a rotary drive unit which rotates one of the tube portions and said nozzle relative to each other so that said water spray impinges sequentially around the entire periphery of the tube portion, a support assembly having a pin insertable into a free end of the tube, wherein said end feed assembly further comprises a sleeve positioned around the tube portion, said sleeve being movable between an extended position in which said sleeve is positioned around and protects the tube portion, and a retracted position in which said sleeve exposes said tube portion.

13. Apparatus for removing an outer layer from a portion of a multi layer tube comprising:

a housing, an end feed assembly which positions the portion of the tube at a preset position, a source of high pressure water, a nozzle, said water source being fluidly connected to said nozzle to produce a high speed water spray, a rotary drive unit which rotates one of the tube portions and said nozzle relative to each other so that said water spray impinges sequentially around the entire periphery of the tube portion, and a longitudinal drive unit operatively connected with the nozzle which moves the nozzle longitudinally with respect to the tube.

* * * * *

UNITED STATES PATENT AND TRADEMARK OFFICE
CERTIFICATE OF CORRECTION

PATENT NO. : 5,991,995

DATED : Nov. 30, 1999

INVENTOR(S) : David J. Gabbey

It is certified that error appears in the above-identified patent and that said Letters Patent is hereby corrected as shown below:

Column 5, line 22, delete "spray" and insert --stream--.

Signed and Sealed this

Second Day of January, 2001

*Attest:*

Q. TODD DICKINSON

*Attesting Officer*

*Commissioner of Patents and Trademarks*